US005693786A

United States Patent [19]
Tanaka et al.

[11] Patent Number: 5,693,786
[45] Date of Patent: Dec. 2, 1997

[54] ESTERFIED, POLYESTER-GRAFTED STARCH

[75] Inventors: Hideyuki Tanaka, Aichi; Yasuhito Okumura, Chiba; Tetsuya Kawamatsu; Hiroshi Tanaka, both of Aichi, all of Japan

[73] Assignee: Japan Corn Starch Co. Ltd., Aichi, Japan

[21] Appl. No.: 606,703

[22] Filed: Feb. 26, 1996

[30] Foreign Application Priority Data

Mar. 3, 1995 [JP] Japan ............................. H07-044491
May 31, 1995 [JP] Japan ............................. H07-133873

[51] Int. Cl.⁶ .................. C08B 31/02; A61K 31/715; A01N 43/04
[52] U.S. Cl. .................. 536/107; 536/124; 514/57; 514/60; 514/54
[58] Field of Search .................. 536/107, 124; 514/57, 60, 54

[56] References Cited

U.S. PATENT DOCUMENTS

| 3,795,670 | 3/1974 | Mark et al. ............... 260/233.5 |
| 4,891,404 | 1/1990 | Narayan et al. ............... 525/54.2 |
| 5,367,067 | 11/1994 | Frische et al. ............... 536/45 |
| 5,462,983 | 10/1995 | Bloembergen et al. ............... 524/51 |

FOREIGN PATENT DOCUMENTS

| WO 92/16583 | 10/1992 | WIPO . |
| WO 93/20110 | 10/1993 | WIPO . |
| WO 94/07953 | 4/1994 | WIPO . |

OTHER PUBLICATIONS

A. M. Mark and C. L. Mehltretter, Die Starke 22. Jahrg, 1970/Nr. 4 (pp. 108–110). Publication discussing the acetylation of high–amylose corn starch.

A. M. Mark and C. L. Mehltretter, Die Starke 24. Jahrg, 1972/Nr. 3 (pp. 73–76). Publication discussing preparation of starch triacetates.

Journal of Applied Polymer Sciences, vol. 22, 1978 (pp. 459–465). "A New Biodegradable Plastic Made From Starch Graft Poly (methyl acrylate) Copolymer". Publication discussing grafted starch–based, biodegradable plastics.

Chemical Abstracts, vol. 95, No. 2, issued Jul. 1981, Nichiden Kagaku Co., Ltd., "Sizing Agents for Polyester Fibers", p. 8760, col. 1, abstract No. 8751c, Patent Document No. JP–56020680.

Primary Examiner—John Kight
Assistant Examiner—Everett White
Attorney, Agent, or Firm—Quarles & Brady

[57] ABSTRACT

A starch derivative which, when incorporated with no or only a little plasticizer, yields moldings having good flexibility, toughness, and water-relating properties for practical use is an esterified, polyester-grafted starch which is formed by esterifying starch and grafting the starch with polyester. The esterification involves the introduction of one or more acyl groups consisting of saturated or unsaturated aliphatic acid groups or aromatic carboxylic acid groups having 2 to 18 carbon atoms and the polyester is one which is formed from one or more 4- to 12-membered lactones by ring-opening polymerization, with the terminal hydroxyl groups being almost completely blocked by esterification.

14 Claims, No Drawings

ESTERFIED, POLYESTER-GRAFTED STARCH

FIELD OF THE INVENTION

The present invention relates to new esterified, polyester-grafted starch derivatives, a process for synthesis thereof, and biodegradable thermoplastic resin compositions made, entirely or in part, from said esterified, polyester-grafted starch derivatives.

BACKGROUND OF THE INVENTION

Because of concerns about environmental protection, active development works are proceeding in the field of biodegradable plastics (thermoplastic resin compositions). Noticeable among them are those which are based on starch derivatives, such as highly esterified starch and polyester-grafted starch. The former is disclosed in U.S. Pat. No. 5,367,067 and PCT/US92/02003, and the latter is reported in "A New Biodegradable Plastic Made from Starch Graft Poly(methyl acrylate) Copolymer" (Journal of Applied Polymer Science, vol. 22, 459–465, 1978). These references do not directly affect the novelty of the present invention.

As far as the present inventors know, no biodegradable plastics based on starch derivatives have been put to practical use and put on the market. A probable reason for this is that the prior art starch derivatives formed by mere esterification or graft-polymerization do not yield products (including sheet, film, and foam) having satisfactory physical properties. That is, the products are brittle and lack toughness necessary for practical use. For the products to have sufficient toughness and flexibility, it is necessary to incorporate into the raw material a large amount of plasticizer (which decreases strength and promotes a degradation with the passage of time). In addition, the products are so susceptible to moisture and water that they cannot be used in applications where good water resistance, moisture resistance, water repellence, and water vapor transmission are required.

SUMMARY OF THE INVENTION

It is an object of the present invention to provide new starch derivatives and thermoplastic resin compositions made therefrom, which, when incorporated with no or only a little plasticizer, yield products having good flexibility, toughness, and water-related properties for practical use.

It is another object of the present invention to provide a process for synthesis of such starch derivatives.

The present invention relates to esterified, polyester-grafted starch derivatives, which are made from starch by both esterification and polyester grafting. The esterification involves the introduction of acyl groups of one or more saturated or unsaturated aliphatic acids or aromatic carboxylic acids having 2 to 18 carbon atoms and the grafted polyester is one which results from the ring-opening polymerization of one or more 4- to 12-membered lactones.

The process of the present invention for synthesis of the esterified, polyester-grafted starch derivatives comprises reacting starch with a vinyl ester or an acid anhydride or an acid chloride (as an esterifying agent) and a lactone (as a grafting agent) in a nonaqueous, organic solvent with the aid of an esterifying catalyst and a grafting catalyst, thereby performing the esterifying and grafting reactions simultaneously or sequentially.

The biodegradable thermoplastic resin compositions of the present invention comprise a base polymer and an optional adjuvant. The base polymer can be comprised entirely of one or more of the esterified, polyester-grafted starch derivatives of the present invention or of one or more of the starch derivatives of the present invention and an additional polymer. The optional adjuvant can be a biodegradable plasticizer and/or filler.

DETAILED DESCRIPTION OF THE PREFERRED EMBODIMENTS

The preferred esterified, polyester-grafted starch derivatives of the present invention are made from starch which has been both esterified and polyester-grafted. The esterification involves the introduction of acyl groups of one or more saturated or unsaturated aliphatic acids or aromatic carboxylic acids having 2 to 18 carbon atoms and the polyester is one which is formed from one or more 4- to 12-membered lactones by ring-opening polymerization, with the terminal hydroxyl groups being almost completely blocked by esterification.

The esterified, polyester-grafted starch derivatives of the present invention may be represented by the structural formula shown below:

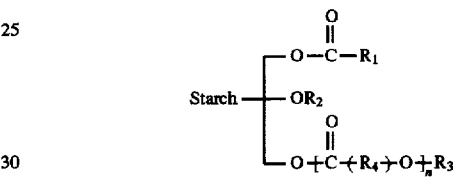

wherein, starch is the residue of a starch molecule (including a low-modified starch); $R_1$ is an alkyl group, an alkenyl group, or aryl group having 1 to 17 carbon atoms (preferably 1 to 7 carbon atoms); $R_2$ is hydrogen or an acyl group having 2 to 18 carbon atoms; $R_3$ is hydrogen or an acyl group having 2 to 18 carbon atoms, and $R_4$ is one or more than one kind of an alkylene group or an ethylidene group represented by $C_mH_{2m}$ (m=1 to 11); and n is less than 4000.

The acyl groups mentioned above may contain an alkyl group, such as methyl, ethyl, propyl, butyl, octyl, dodecyl, and stearyl etc. The alkenyl groups mentioned above are exemplified by aryl, hexenyl, and octenyl etc. The aryl group mentioned above are exemplified by benzyl, p-toluyl, and xylyl etc. Preferred alkyl groups include methyl, ethyl, and propyl.

By the term "degree of substitution (DS) by esterification" is meant in this specification the average number of the hydroxyl groups on a starch molecule and the average number of terminal hydroxyl group of grafted polyester which are blocked through esterification. "DS=3" means 100% blocking.

According to the present invention, the degree of substitution (DS) by esterification should be 0.1 to 3.0 (preferably 0.5 to 3.0), and the degree of molecular substitution (MS) by grafting with polyester (polylactone) molecules should be 0.1 to 20 (preferably 0.2 to 10). The latter is calculated using the following formula:

$$MS = \frac{(A-B)/C}{(D/E)}$$

where,

A: weight of lactone charged

B: weight of lactone remaining unreacted

C: molecular weight of lactone

D: weight of starch charged

E: molecular weight of starch

A value of DS smaller than 0.1 suggests little improvement in physical properties such as moisture absorption and moldability. The value of DS should be as close to 3.0 as possible, so that the resulting products have improved water resistance and other water-related properties. With a value of MS smaller than 0.1, the modified starch exhibits plasticity but does not yield products having improved physical properties, as well as, biodegradability. A value of MS greater than 20 suggests that the modified starch is impracticable because of its high production cost and long reaction time and its incapability to yield satisfactory products.

The esterified, polyester-grafted starch derivatives of the present invention are preferrably prepared by a process which comprises reacting starch with a vinyl ester or an acid anhydride or an acid chloride (as an esterifying agent) and a lactone (as a grafting agent) in a nonaqueous organic solvent with the aid of an esterifying/grafting catalyst, thereby performing the esterifying and grafting reactions simultaneously or sequentially.

Where the esterifying and grafting are carried out sequentially, the order is immaterial. It is possible to start the process with a commercial esterified starch or a commercial polyester-grafted (or lactone-grafted) starch. The former is ready for grafting with lactone and is also ready for esterifying with vinyl ester, acid anhydride, or acid chloride, and the latter is ready for esterifying with vinyl ester, acid anhydride, or acid chloride.

The raw starch which may be used in the above-mentioned process includes the following:

(a) Corn starch, high-amylose corn starch, wheat starch, and other unmodified starches originating from terrestrial stems;

(b) Potato starch, tapioca starch, and other unmodified starches originating from subterranean stems; and, (c) Slightly modified starches prepared from the above-mentioned starches by esterification, etherification, oxidation, acid treatment, and dextrinizing.

These starches may be used alone or in combination with one another.

The vinyl ester used for esterifying is one in which the ester group has 2 to 18 carbon atoms (preferably 2 to 7 carbon atoms). One or more vinyl esters may be used alone or in combination with one another. Any vinyl ester in which the ester group has more than 18 carbon atoms is high in yields of reagent utilization but poor in reaction efficiency. Any vinyl ester in which the ester group has 2 to 7 carbon atoms is desirable because of its high reaction efficiency (70% or above).

Typical examples of the vinyl esters are given below. Of these examples, vinyl acetate and vinyl propionate are desirable because of their high reaction efficiency. (The parenthesized number indicates the number of carbon atoms in the ester group.)

The preferred esters are:

(a) Vinyl esters of saturated aliphatic carboxylic acids, such as vinyl acetate (C2), vinyl propionate (C3), vinyl butanoate (C4), vinyl caproate (C6), vinyl caprylate (C8), vinyl laurate (C12), vinyl palmitate (C16), and vinyl stearate (C18);

(b) Vinyl esters of unsaturated aliphatic carboxylic acids, such as vinyl acrylate (C3), vinyl crotonate (C4), vinyl isocrotonate (C4), and vinyl oleate (C18); and, (c) Vinyl esters of aromatic carboxylic acids, such as vinyl benzoate and vinyl p-methylbenzoate.

The preferred acid anhydrides and acid chlorides used as esterifying agents are those of organic acids having 2 to 18 carbon atoms, preferably 2 to 8 carbon atoms. Especially preferred examples include anhydrides and chlorides of acetic acid, propionic acid, and butyric acid.

In one embodiment of the invention, the nonaqueous organic solvent is a vinyl ester. This embodiment obviates the necessity of solvent recovery in the purification step. Incidentally, this mode of reaction is not employed in the conventional esterification with a vinyl ester.

This embodiment offers the advantage that the resulting product does not decrease in molecular weight and the reaction efficiency of vinyl ester is high. On the other hand, this embodiment has the disadvantage that the vinyl ester has to be used in the form of liquid (or heated melt) and the reaction is slightly uneven. The vinyl esters that can be used in this embodiment includes those exemplified above.

In another second embodiment of the present invention, the nonaqueous organic solvent is not a vinyl ester. In other words, the vinyl ester used as the esterifying agent is not used as the nonaqueous organic solvent.

The advantage of not using a vinyl ester as the nonaqueous organic solvent is that it is possible to readily control the reactant concentration and reaction rate regardless of the kind of the esterifying agent (or vinyl ester, acid anhydride, and acid chloride). Another advantage is that the reaction is more uniform than in the case where a vinyl ester is used as the nonaqueous organic solvent. However, there is a disadvantage that the solvent has to be recovered after separation from the vinyl ester, acid anhydride, or acid chloride.

The nonaqueous organic solvent for use in the process may be selected from the following examples:

(a) Polar solvents, such as dimethyl sulfoxide (DMSO), dimethylformamide (DMF), and pyridine, which dissolve starch; and (b) Polar solvents, such as ethyl acetate and acetone, which do not dissolve starch but dissolve the vinyl ester, acid anhydride, acid chloride, and esterified starch (without reaction with vinyl ester, acid anhydride, and acid chloride). The non-aqueous solvents may be used alone or in combination with one another.

Of the above examples, DMSO, DMF, and pyridine are desirable from the standpoint of the efficiency and uniformity of their reaction.

The esterifying catalyst may be selected from any of the following three groups:

(a) Hydroxides and/or mineral acid salts or organic acid salts, carbonates, and alkoxides of metals belonging to alkali metals, alkaline earth metals, and amphoteric metals;

(b) Organic phase transfer catalysts; and (c) Amino compounds.

Of these groups, the first one is desirable from the standpoint of reaction efficiency and catalyst cost.

Examples of each group of catalyst are given below:

(a) Alkali metal hydroxides, such as sodium hydroxide, potassium hydroxide, and lithium hydroxide; alkali metal salts of organic acids such as sodium acetate, sodium propionate, and sodium p-toluenesulfonate; hydroxides of alkaline earth metals, such as barium hydroxide and calcium hydroxide; alkaline earth metal salts of organic acids, such as calcium acetate, calcium propionate, and barium p-toluenesulfonate; salts of mineral acids, such as sodium phosphate, calcium phosphate, sodium bisulfite, sodium bicarbonate, and potassium sulfate; salts of acids of amphoteric metals, or hydroxides of amphoteric metals such as sodium aluminate, potassium zincate, aluminum hydroxide, and zinc hydroxide; carbonates, such as sodium carbonate and potassium bicarbonate; and metal alkoxides including sodium alcoholates, such as sodium methylate and sodium ethylate; trialkoxyaluminum compounds, such as aluminum isopropylate and aluminum ethylate; and alkoxy-type aluminum chelate compounds, such as aluminum ethyl acetoacetate diisopropylate;

(b) Amino compounds, such as dimethylaminopyridine and diethylaminoacetic acid; and (c) Quaternary ammonium compounds, such as N-trimethyl-N-propyl ammonium chloride and N-tetraethylammonium chloride.

In a preferred embodiment of the process, the catalyst is previously impregnated into starch so as to improve the reaction efficiency in the case where the reaction is carried out in a vinyl ester as the medium or the reaction is carried out in a nonaqueous solvent which does not dissolve starch.

The following methods for impregnation can be used:

(a) A method consisting of dipping raw starch in an aqueous solution containing the catalyst;

(b) A method consisting of mixing raw starch with an aqueous solution or solvent containing the catalyst using a mixing apparatus such as kneader;

(c) A method consisting of pregelatinizing raw starch using a drum dryer or the like together with an aqueous solution or solvent containing the catalyst; and (d) A method consisting of gelatinizing raw starch using a batch cooker or continuous cooker together with an aqueous solution or solvent containing the catalyst.

The esterification may be carried out at any temperature which is not specifically restricted. The reaction temperature is usually about 30° to about 200° C., preferably about 60° to about 150° C. for better efficiency.

When the esterification employs an acid anhydride, it is carried out at 40° C. or below so that starch will not decrease in molecular weight (due to hydrolysis). By contrast, the preferred esterification reaction that employs a vinyl ester can be carried out at higher temperatures because it gives no acid as the by-product. This leads to higher efficiency.

When vinyl ester is used as the esterifying agent it should be used in amounts from about 1 to about 20 moles, and preferably about 1 to about 7 moles per mole of raw starch.

The amount of the esterifying catalyst to be used should be usually about 1 to about 30% of anhydrous starch by weight.

In the process of the present invention one or more lactones (including dimer and trimer cyclic esters) are used as the grafting agent(s). They are selected from 4 to 12 membered lactones, whose examples include β-propiolactone (4), γ- and δ-valerolactones (6), δ- and ε-caprolactones (6, 7), disalicylide (8), trisalicylide (12), 1,4-dioxan-2-on, glycolide, lactide, trimethylene carbonate, and ethylene oxalate. Of these examples, the 4 to 7 membered lactones, especially ε-caprolactone and lactide, are preferred.

The grafting by radical by ring-opening polymerization may be accomplished either before or after the above-mentioned step of esterifying. Alternatively, the grafting may be performed on a commercial esterified starch having an adequate degree of substitution.

The grafting or polymerization may be carried out by any method, for example, anionic polymerization, cationic polymerization, and coordination polymerization. The first method is desirable because it permits the grafting catalyst to be used in combination with the esterifying catalyst.

The polymerization should preferably be carried out in the same nonaqueous, organic solvent (polar solvent) that is used for esterifying. The polymerization should be carried out under the conditions which are similar to those under which grafting is performed on starch by ring-opening polymerization.

In the case of anionic polymerization, the same catalyst as that used for esterifying mentioned above is also applied to grafting reaction. In the case of cationic polymerization, it is possible to use as the grafting catalyst an oxonium salt, protonic acid, and a Lewis acid (with or without cocatalyst). The amount of the grafting catalyst should be about 5 ppm (part per million) to about 50 wt % for the amount of the monomer.

The coordination polymerization may employ a reaction product of an organoaluminum or organozinc compound as the catalyst and water or acetylacetone or both (0.5–1.0 mole).

The biodegradable thermoplastic resin compositions of the present invention are comprised of a base polymer and an optional adjuvant. The base polymer is composed entirely or partly of the esterified, polyester-grafted starch derivatives of the present invention and the optional adjuvant which can be a biodegradable plasticizer and/or filler. The amount of the esterified, polyester-grafted starch in the base polymer can be from 5 to 100 wt %, preferably 25 to 100 wt %. The amount of the plasticizer to be used is usually 0–60 (parts per hundred) phr, preferably less than 30 phr. The amount of the filler to be used is usually 0–200 phr, preferably 0–150 phr.

When the base polymer is composed of the esterified, polyester-grafted starch and an additional polymer, the latter should be one or more members selected from the group consisting of esterified and/or etherified starch derivatives, biodegradable polyesters, cellulose derivatives, polyvinyl alcohols, and polyvinyl esters. Other examples of the additional polymers include polyamides, polycarbonates, polyurethanes, polyvinyl esters, vinyl polymers (excluding polyvinyl ester), polyolefins, polyalkylene oxides, biodegradable polyalkylene oxides, ethylene-vinyl acetate copolymers, ethylene-ethyl acrylate copolymers, ethylene-methyl acrylate copolymers, ABS resins, and styrene-acrylonitrile copolymers.

Specific examples of these polymers are given below:

(a) Biodegradable polyesters including polycaprolactone, polylactic acid, polyadipate, polyhydroxybutyrate, polyhydroxybutyrate-valeate, etc.;

(b) Cellulose derivatives including cellulose acetate, hydroxyalkylcellulose, carboxyalkylcellulose, etc;

(c) Polyvinyl esters including polyvinyl acetate, polyacrylonitrile, polyvinyl carbazole, polyacrylate ester, polymethacrylate ester, etc.;

(d) Polyolefins including polyethylene, polyisobutylene, polypropylene, etc.;

(e) Vinyl polymers (excluding polyvinyl ester), including vinyl chloride, polystyrene, etc.; and (f) Polyalkylene oxide including polyethylene oxide, polypropylene oxide, etc.

The biodegradable plasticizer may be one or more members selected from phthalate esters, aromatic carboxylate esters, aliphatic dibasic acid esters, aliphatic ester derivatives, phosphate esters, polyester plasticizers, epoxy plasticizers, and polymeric plasticizers.

Specific examples of these plasticizers are given below:

(a) Phthalate esters including dimethyl phthalate, diethyl phthalate, dibutyl phthalate, dioctyl phthalate, ethylphthalyl ethyl glycolate, ethylphthalyl butyl glycolate, etc.;

(b) Aliphatic dibasic acid esters including butyl oleate, glycerin monooleate ester, butyl adipate, n-hexyl adipate, etc.;

(c) Aromatic carboxylate esters including trioctyl, trimellitate, diethylene glycol benzoate, octyl oxybenzoate, etc.;

(d) Aliphatic ester derivatives including sucrose octacetate, diethylene glycol dibenzoate oxyacid ester, methyl acetylrecinolate, triethyl acetylcitrate, triacetin, tripropionin, diacetylglycerin, glycerin monostearate, etc.;

(e) Phosphate esters including tributyl phosphate, triphenyl phosphate, etc.;

(f) Epoxy plasticizers including epoxidized soybean oil, epoxidized castor oil, alkylepoxy stearate, etc.; and (g) Polymeric plasticizers including liquid rubbers, terpenes, linear polyester, etc.

The fillers that may be used are one or more members selected from synthetic and natural inorganic fillers and organic fillers. Specific examples of the fillers are given below:

(a) Inorganic fillers including talc, titanium oxide, clay, chalk, limestone, calcium carbonate, mica, glass, diatomaceous earth, wollastonite, silicates, magnesium salt, manganese salt, glass fiber, ceramic powder, etc.; and (b) Organic fillers including powdered cellosic fiber (and derivatives thereof), wood powder, pulp, pecan fiber, cotton powder, hulls, cotton linter, wood fiber, bagasse, etc.

The esterified, polyester-grafted starch derivatives and the thermoplastic resin compositions of the present invention are useful in a broad range of application areas, including the following:

(a) Films and sheets formed by extrusion, casting, rolling, inflation, etc.

(b) Laminations and coatings on paper, sheet, film, nonwoven fabric, etc.

(c) Additives to be incorporated into paper during papermaking processes to impart special functions to paper and paper products.

(d) Additives to be incorporated into non-woven fabric during manufacturing processes to impart special functions to non-woven fabrics and their products.

(e) Aqueous emulsions or suspensions.

(f) Products such as solid or cellular moldings, which can be produced by injection molding, extrusion molding, blow molding, transfer molding, compression molding, etc.

The present invention provides novel esterified, grafted starch derivatives, a process for synthesis thereof, and thermoplastic resin compositions containing said starch derivatives. As demonstrated in the following examples, the resin compositions produce products having good impact resistance and flexibility for practical use in both dry and wet states even though no or only a little plasticizer is used.

The esterified, polyester-grafted starch derivatives containing thermoplastic resin compositions yield products which have the following desirable properties:

1) Elongation greater than 10% in elastic limit.

2) Improved water vapor transmission.

3) Good flexibility which makes it possible to produce film without plasticizer or with only a little plasticizer.

4) Good retention of plasticizer.

5) Ability to accept a large amount (up to 50%) of inexpensive mineral filler (such as talc and calcium carbonate), without adverse effect on moldability.

6) Low flexural modulus and good flexibility (in the case of injection molding).

In addition to the above-mentioned properties, the resulting products are still biodegradable.

It is believed that the above-mentioned properties are due to increased molecular weight, adequate crystallinity, polarity distribution, internal plasticizing, etc. The increased molecular weight is due to the acyl group (ester) introduced through the alcoholic hydroxyl groups of starch and the grafted polylactone having almost completely blocked terminal hydroxyl groups. Another reason is the fact that the alcoholic hydroxyl groups of starch are blocked and the terminal hydroxyl groups of the grafted polylactone are almost completely blocked.

The present invention provides a novel process for synthesis of the esterified, polyester-grafted starch derivatives. This process produces the following effects which are not expected from the conventional process for synthesis of highly esterified starch and polyester-grafted starch:

(a) Polyester grafting (ring-opening polymerization) at low temperatures. This protects the starch from thermal decomposition which lowers the molecular weight of starch. The process of the present invention employs a catalyst which is effective for both esterifying and grafting. This catalyst previously activates (or anionizes) the alcoholic hydroxyl groups of starch as shown below, so that the lactone graft-polymerization and the esterification take place simultaneously in the same system:

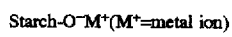

Starch-O⁻M⁺(M⁺=metal ion)

The above reaction prevents the formation of polyester homopolymer and produces the graft side chains on starch.

(b) The esterifying reaction makes it possible to block the terminal hydroxyl groups of grafted polylactone while suspending the ring-opening polymerization. The result is that the reaction product is hydrophobic even though the grafted side chains have a low degree of polymerization. The hydrophobic product is easy to handle and recover in water.

Using the process of the present invention, it is possible to easily produce a variety of esterified, polyester-grafted starch derivatives varying in the degree of polymerization of side chains, by using a non-toxic, inexpensive catalyst.

The invention will be understood more readily by reference to the following Examples and Comparative Examples; however, these examples are intended to illustrate the invention and are not to be construed to limit the scope of the invention. In the examples, "parts" means "parts by weight" unless otherwise indicated.

Preparation (synthesis) of esterified, polyester-grafted starch

EXAMPLE 1

Starch was mixed by heating with a catalyst and a nonaqueous solvent (polar solvent). To the mixture was added ε-caprolactone for grafting and then added vinyl acetate monomer for esterifying. Thus, there was obtained an esterified, polyester-grafted starch. The reaction conditions and amounts of each component are shown below:

| | |
|---|---|
| High-amylose corn starch | 100 g |
| ↓ Sodium bicarbonate | 30 g |
| ↓ DMSO | 104 g |
| ↓ | |
| Heating and kneading (at 45° C.) | 10–30 min |
| ↓ | |
| Sodium-starch complex | |
| ↓ ε-caprolactone | 422.2 g |
| ↓ | |
| Heating to 80° C. (stirring and mixing) | |
| Reaction time (3 hours) | |
| ↓ Vinyl acetate monomer | 192.2 g |
| ↓ | |
| Reaction time, 2 hours (stirring) | |
| ↓ | |
| Recovering under water | |
| ↓ | |
| Dewatering, washing, drying. | |

EXAMPLE 2

Starch was gelatinized in a polar solvent. To the gelatinized starch were added ε-caprolactone and vinyl propionate monomer so as to carry out esterifying and grafting simultaneously in the presence of a catalyst. Thus, there was obtained an esterified, polyester-grafted starch. The reaction conditions and amounts of each component are shown below:

| | |
|---|---|
| Corn starch | 100 g |
| ↓ DMSO | 800 g |
| ↓ | |
| Gelatinizing at 80° C. for 20 minutes | |
| ↓ Sodium carbonate | 30 g |
| ↓ ε-caprolactone | 668.5 g |
| ↑ Vinyl propionate monomer | 220.8 g |
| ↓ | |
| Reaction at 80° C. for 5 hours | |
| ↓ | |
| Recovering under water | |
| ↓ | |
| Dewatering, washing, drying. | |

EXAMPLE 3

An oxidized starch was mixed by heating with a catalyst and a nonaqueous solvent (polar solvent). To the mixture was added ε-caprolactone for grafting and then added vinyl acetate monomer for esterifying. Thus, there was obtained an esterified, polyester-grafted starch. The reaction conditions and amounts of each component are shown below:

| | |
|---|---|
| Oxidized starch | 100 g |
| ↓ Sodium bicarbonate | 30 g |
| ↓ DMSO | 104 g |
| ↓ | |
| Heating and kneading (at 45° C.) | |
| ↓ | |
| Sodium-starch complex | |
| ↓ ε-caprolactone | 211.5 g |
| ↓ | |
| Reaction at 80° C. for 4 hours | |
| ↓ Vinyl acetate monomer | 191.8 g |
| ↓ | |
| Reaction at 80° C. for 4 hours | |
| ↓ | |
| Recovering under water | |
| ↓ | |
| Dewatering, washing, drying. | |

EXAMPLE 4

An acetylated starch (having a high degree of substitution) was mixed by heating with water, a catalyst, and a nonaqueous solvent (polar solvent). To the mixture was added ε-caprolactone for grafting and then added vinyl acetate monomer for esterifying. Thus, there was obtained an esterified, polyester-grafted starch. The reaction conditions and amounts of each component are shown below:

| | |
|---|---|
| Highly-acetylated high-amylose corn starch (DS = 2.8) | 100 g |
| ↓ ← Sodium carbonate | 30 g |
| ↓ ← Water | 2.9 g |
| ↓ ← DMSO | 104 g |
| ↓ Heating and kneading ↓ | |
| Sodium-starch complex | |
| ↓ ← ε-caprolactone ↓ | 407.2 g |
| Heating to 80° C. (stirring and mixing) Reaction time: 3 hours | |
| ↓ ← Vinyl acetate monomer ↓ | 30.8 g |
| Reaction time: 2 hours | |
| ↓ Recovering under water ↓ | |
| Dewatering, washing, drying. | |

COMPARATIVE EXAMPLE 1

An acid-treated starch was gelatinized in a polar solvent. To the gelatinized starch were added a catalyst and then added acetic anhydride for esterifying. Thus, there was obtained an esterified starch with a high degree of substitution. The reaction conditions and amounts of each component are shown below:

| | |
|---|---|
| Acid-treated high-amylose corn starch | 100 g |
| ↓ ← DMSO | 800 g |
| ↓ ← Gelatinizing | |
| ↓ ← Sodium bicarbonate | 30 g |
| ↓ ← Dimethylaminopyridine | 5.4 g |
| ↓ ← Acetic anhydride ↓ | 302.2 g |

| | |
|---|---|
| Reaction at 65° C. for 4 hours | |
| ↓ Degree of ester substitution ↓ | 2.45 |
| Dewatering, washing, and drying. | |

COMPARATIVE EXAMPLE 2

Starch was mixed with a polar solvent and a catalyst (alkali metal salt). To the mixture were added caprolactone and triethylamine (as a catalyst). The process in Comparative Example 2 was modified by replacing cold water by acetone so as to increase the yield. After reaction, there was obtained a grafted starch. The reaction conditions and amounts of each component are shown below:

| | |
|---|---|
| corn starch | 100 g |
| ↓ ← N,N-dimethylacetamide | 1299 g |
| ↓ ← Anhydrous lithium chloride ↓ | 117.3 g |
| Stirring and mixing at 165° C. for 30 minutes | |
| ↓ ← ε-caprolactone | 635.8 g |
| ↓ ← Triethylamine ↓ | 61.5 g |
| Reaction at 85° C. for 18 hours | |
| ↓ Cooling and dissolving in methanol | |
| ↓ Precipitation in cold water, washing, and recovery. The reaction product was a very soft rubbery substance, which presented difficulties in recovery and washing. | |

The starch derivatives obtained in the above-mentioned examples and comparative examples were tested for the following items:

(1) Degree of molecular substitution (MS) by grafting (as mentioned above)

(2) Degree of substitution (DS) by esterification:

The average number of the reactive hydroxyl groups and the terminal hydroxyl groups of grafted polyester at the positions 2, 3, and 6 on the glucose unit of starch which have been converted into ester bonds. "DS=3" means 100% substitution.

The results are shown in Table 1.

TABLE 1

| | MS | DS |
|---|---|---|
| Example 1 | 2.17 | 1.98 |
| Example 2 | 1.24 | 2.57 |
| Example 3 | 0.55 | 2.78 |
| Example 4 | 0.31 | 2.69 |
| Comparative Example 1 | — | 2.45 |
| Comparative Example 2 | 1.9 | — |

The reaction products in Examples and Comparative Examples vary in the ease with which they are recovered from the aqueous system. The results are shown in Table 2.

TABLE 2

| | Recovery of reaction products |
|---|---|
| Example 1 | White hydrophobic solids that permit easy filtration, washing, and dehydration. |
| Example 2 | " |
| Example 3 | " |
| Example 4 | " |
| Comparative Example 2 | Very soft rubbery substance that presents difficulties in filtration, dispersion washing, and dewatering. |

TEXT EXAMPLES

Test Example 1

Resin compositions were prepared from the samples of the starch derivatives obtained in Example 1 and Comparative Examples 1 and 2. Each sample (100 parts) was incorporated with a plasticizer (triacetin) in an amount necessary for the resin compositions to exhibit almost the same level of tensile modulus as shown in Table 3.

Each resin composition was formed into dumbbell specimen, flexural specimen, disc specimen (conforming to JIS) by injection molding after extrusion at 120° C.

The specimens were tested for the following items according to the test methods indicated after the test item.

(1) Tensile modulus, tensile strength, elongation at break, and elongation in elastic limit: JIS K-7113
(2). Moisture absorption: The small specimen (of type No. 1) is allowed to .stand at 23° C. and 75 % RH for 96 hours and its weight increase is measured. Moisture absorption is expressed in terms of the ratio of the weight increase to the weight of the specimen measured before conditioning.
(3) Water absorption: The small specimen (of type No. 1) is immersed in water at 20° C. for 24 hours and its weight increase is measured. Water absorption is expressed in terms of the ratio of the weight increase (excluding surface water) to the weight of the specimen measured before immersion.

The results are shown in Table 3. It is noted that the specimen in Example 1, in which is incorporated a lesser amount of plasticizer is comparable to the specimens in Comparative Examples 1 and 2 in tensile modulus. In addition, the former was far superior to the latter in tensile strength and toughness and water-related properties (moisture absorption and water absorption).

TABLE 3

| | Condition | Example 1 | Comparative Example 1 | Comparative Example 2 |
|---|---|---|---|---|
| Plasticizer (parts) | | 20 | 60 | 30 |
| Tensile modulus | A | 6538 | 5863 | 6908 |
| | B | 3296 | 4165 | 1078 |
| Maximum tensile | A | 150.0 | 118.2 | 135.3 |
| strength (kg/cm²) | B | 92.0 | 68.4 | 18.6 |
| Elongation at | A | 36.7 | 21.8 | 28.9 |
| break (%) | B | 93.0 | 19.5 | 82.0 |
| Elongation in elastic | A | 11.5 | 3.0 | 8.5 |
| limit (%) | B | 12.4 | 4.5 | 4.7 |

TABLE 3-continued

| | Condition | Example 1 | Comparative Example 1 | Comparative Example 2 |
|---|---|---|---|---|
| Moisture absorption (%) | B | 3.1 | 3.9 | 9.7 |
| Water absorption (%) | | 3.5 | 5.8 | 11.7 |

Condition A: measured immediately after conditioning at 23° C. and 50% RH for 72 hours
Condition B: measured after storage at 23° C. and 75% RH for 96 hours.

Text Example 2

Resin compositions were prepared from the samples of the starch derivatives obtained in Example 2 and Comparative Examples 1 and 2. Each sample (100 parts) was incorporated with a plasticizer (tripropionin) in an amount necessary for the resulting films to exhibit almost the same level of elongation as shown in Table 4.

Each resin composition was made into 30-μm thick film by extrusion at 120° C. This film was laminated onto double-bleached kraft paper (with a basis weight of 125 g/m²) by heat sealing. The resulting laminate paper was tested for the following items according to the test method specified.
(1) Water vapor transmission rate . . . JIS Z0208
(2) Water resistance . . . (Cobb test for 60 min) JIS P8140
(3) Folding endurans . . . JIS P8114 (This is a measure to indicate the ability of the film to retain the plasticizer.)

The results of the tests are shown in Table 4. It is noted that the sample in Example 2 is by far superior to the samples in Comparative Examples 1 and 2 in water-related properties (water vapor transmission and water resistance) and the ability to retain the plasticizer.

TABLE 4

| | Example 2 | Comparative Example 1 | Comparative Example 2 |
|---|---|---|---|
| Plasticizer (parts) | 30 | 50 | 30 | 30 |
| Water vapor transmission rate (g/24 h-m²) | 250 | 945 | 780 | 680 |
| Water resistance (g/m²) | 4.5 | 4.8 | 10.5 |
| Flexural strength (cycles) | 895 | 65 | 120 |
| Condition A | 1000< | 22 | 115 |
| Condition B | | | |

Condition A: measured immediately after conditioning at 23° C. and 50% RH for 72 hours
Condition B: measured after storage at 23° C. and 75% RH for 96 hours.

Test Example 3

Resin compositions were prepared from the samples of starch derivatives obtained in Example 3 and Comparative Examples 1 and 2. Each sample (100 parts) was incorporated with a plasticizer (triacetin) and a filler in an amount shown in Table 5.

The resulting resin composition was made into test specimens (conforming to JIS K7203) by injection molding under the following conditions. The specimens were tested for flexural strength and flexural modulus. Molding condition: temperature . . . 165° C., injection pressure . . . primary (65%), secondary (35%), tertiary (30%), injection molding machine . . . PS-40 made by Nissei Jushi Kogyo Co., Ltd.

The results of the tests are shown in Table 5. It is noted that the sample in Example 3 can accept more inorganic filler than the samples in Comparative Examples 1 and 2 and that the former has a lower flexural modulus and lower stiffness than the latter when the same amount of filler is incorporated.

TABLE 5

|  |  | Example 3 | Comparative Example 1 | Comparative Example 2 |
|---|---|---|---|---|
| Plasticizer (triacetin) |  | 10 | 10 | 10 |
| Flexural strength | Talc: 30 | 298 | 536 | 415 |
|  | Talc: 50 | 568 | not moldable | not moldable |
| Flexural modulus | Talc: 30 | 25439 | 62914 | 55200 |
|  | Talc: 50 | 57300 | — | — |

Test Example 4

Resin compositions were prepared from the samples of starch derivatives obtained in Example 4 and Comparative Examples 1 and 2. Each sample (1 g) was mixed with 20 g of shale soil. The mixture was given water so that the maximum water capacity was 60%. The sample was tested for biodegradability by measuring the amount of carbon dioxide gas evolved from the sample by decomposition at 25° C.

The results of the tests are shown in Table 6. It is noted that the sample in Example 4 is comparable in biodegradability to those in Comparative Examples 1 and 2.

TABLE 6

| Amount of carbon dioxide gas evolved (ml) | Example 4 | Comparative Example 1 | Comparative Example 2 |
|---|---|---|---|
| After 4 hours | 6.2 | 6.4 | 5.9 |
| After 12 hours | 15.5 | 15.8 | 16.5 |
| After 24 hours | 30.1 | 26.9 | 28.0 |

Test Example 5

The samples of the starch derivatives obtained in Example 4 and Comparative Example 1 were tested for glass transition point by using Shimadzu heat flux differential scanning calorimeter (DSC-50) under the following conditions:

Sample: 8,600 mg, cell: aluminum, gas: nitrogen, flow rate: 50.00 mL/min, heating rate: 10° C./min, hold temperature: 220° C.

The test results are shown in Table 7. It is noted that the sample in Example 4 has a lower glass transition temperature than that in Comparative Example 1. This suggests that the former can be molded without a plasticizer.

TABLE 7

|  | Example 4 | Comparative Example 1 |
|---|---|---|
| On-set | 73.41° C. | 177.86° C. |
| End-set | 87.24.° C. | 184.31° C. |

On-set: temperature at which transition begins.

End-set: temperature at which transition is complete.

They define the glass transition temperature region.

We claim:

1. An esterified, polyester-grafted starch derivative of the following formula:

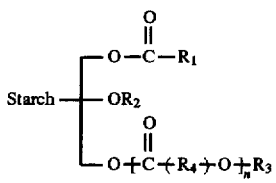

wherein, Starch is the residue of a starch molecule; $R_1$ is a member selected from the group consisting of an alkyl group, an alkenyl group, and an aryl group having all 1 to 17 carbon atoms; $R_2$ is a member selected from the group consisting of hydrogen and an acyl group having 2 to 18 carbon atoms; $R_3$ is a member selected from the group consisting of hydrogen and an acyl group having 2 to 18 carbon atoms; $R_4$ is one or more than one of a member selected from the group consisting of an alkylene group and an ethylidene group represented by $C_mH_{2m}$ (m=1 to 11); and n is less than 4000.

2. The esterified, polyester-grafted starch as claimed in claim 1, wherein the esterification is in such a state that the degree of substitution (DS) is 0.1 to 3.0 and the grafting with polyester is in such a state that the degree of molecular substitution is 0.1 to 20.

3. A biodegradable thermoplastic resin composition which comprises a base polymer and an optional adjuvant, said base polymer being composed at least in part of an esterified, polyester-grafted starch derivative of claim 1 and the optional adjuvant is a biodegradable plasticizer and/or a filler.

4. A biodegradable thermoplastic resin composition of claim 3, wherein the base polymer comprises the esterified, polyester-grafted starch derivative and an additional polymer which is a member selected from the group consisting of ester- and/or ether-modified starches, biodegradable polyesters, cellulose derivatives, polyvinyl alcohol, and polylactone.

5. A biodegradable thermoplastic resin composition as claimed in claim 3, wherein the biodegradable plasticizer is a member selected from the group consisting of phthalate esters, aromatic carboxylate esters, aliphatic dibasic acid esters, aliphatic acid ester derivatives, phosphate esters, polyester plasticizers, epoxy plasticizers, and polymeric plasticizers.

6. The biodegradable thermoplastic resin composition as claimed in claim 3, wherein the filler is a natural or synthetic member selected from the group consisting of inorganic fillers and organic fillers.

7. An esterified, polyester-grafted starch derivative which is formed by esterifying starch and grafting starch with polyester, wherein the esterification involves the formation of ester of one or more saturated or unsaturated aliphatic acids or aromatic carboxylic acids having 2 to 18 carbon atoms and the polyester is one which is formed from one or more 4- to 12-membered lactones by ring-opening polymerization, with the terminal hydroxyl groups being almost completely blocked by esterification.

8. A process for the preparation of an esterified, polyester-grafted starch derivative, said process comprising reacting starch with a member of the group consisting of a vinyl ester, an acid anhydride, and an acid chloride as an esterifying agent and a lactone as a grafting agent in a nonaqueous organic solvent with the aid of an esterifying/grafting catalyst, thereby performing the esterifying and grafting reactions simultaneously or sequentially.

9. The process as claimed in claim 8, wherein the non-aqueous organic solvent is a member selected from the group consisting of an organic solvent capable of dissolving starch and an organic solvent incapable of dissolving starch but capable of dissolving or miscible with the vinyl esters, the lactones and the esterified, polyester-grafted starch.

10. The process as claimed in claim 8, wherein said esterifying/grafting catalyst is a member selected from the group consisting of (1) hydroxides, mineral acid salts, carbonates, and alkoxides of metals in the first five periods in the Periodic Table, (2) an organic phase transfer catalyst, and (3) amino compounds.

11. The process of claim 8, wherein said catalyst is impregnated into raw starch prior to its use.

12. The process as claimed in claim 8, wherein said esterifying/grafting catalyst is a member selected from the group consisting of alkali metal hydroxides, basic alkali metal salts, and metal alkoxides.

13. The process as claimed in claim 12, wherein the starch is heated with said catalyst and a nonaqueous organic solvent capable of dissolving starch and the resulting mixture is reacted first with said esterifying agent and then with said grafting agent.

14. The process as claimed in claim 12, wherein the starch is an esterified starch with a high degree of substitution (DS: 2.0 or above) which has been deesterified and then reacted with a grafting agent and subsequently with an esterifying agent.

* * * * *